United States Patent
Winters

[11] 3,909,346
[45] Sept. 30, 1975

[54] PROCESS FOR MAKING ASBESTOS BACKING SHEETS FOR VINYL FLOOR COVERING

[75] Inventor: Donald C. Winters, White House Station, N.J.

[73] Assignee: Congoleum Industries, Inc., Kearny, N.J.

[22] Filed: Sept. 26, 1974

[21] Appl. No.: 509,488

Related U.S. Application Data

[63] Continuation-in-part of Ser. No. 261,439, June 9, 1972, abandoned, which is a continuation-in-part of Ser. No. 19,757, March 16, 1970, abandoned.

[52] U.S. Cl. .................. 162/155; 162/169; 162/183
[51] Int. Cl.² ..................... D21H 5/18; D21H 3/64
[58] Field of Search ............ 162/155, 169, 183, 185

[56] References Cited
UNITED STATES PATENTS

| | | | |
|---|---|---|---|
| 1,799,217 | 4/1931 | DeCew | 162/183 |
| 2,759,813 | 8/1956 | Feigley et al. | 162/155 |
| 2,868,641 | 1/1959 | Feigley | 162/155 |
| 2,940,893 | 6/1960 | Feigley et al. | 162/155 |
| 3,193,446 | 7/1965 | Eisenberg | 162/145 |

FOREIGN PATENTS OR APPLICATIONS
1,558  4/1931  Australia.............................. 162/155

Primary Examiner—S. Leon Bashore
Assistant Examiner—William F. Smith
Attorney, Agent, or Firm—Richard T. Laughlin

[57] ABSTRACT

A process for manufacturing a felt backing sheet of crysotile asbestos fibers, the sheet being saturated with a synthetic rubber latex binder, the sheet being particularly useful for backing sheets utilized in the manufacture of vinyl floor covering and the like. The process comprises a continuous precipitation of the synthetic rubber latex onto asbestos fibers without the necessity of using a coagulating aid, a precipitating agent, or other chemical or physico-chemical means for controlling the deposition of the latex. The process is carried out by admitting an aqueous asbestos slurry into a feed line and subsequently adding a latex binder thereto. The asbestos slurry-latex binder mixture is carried to an in-line blender where intimate mixture is achieved to effect precipitation of the latex onto the asbestos fibers preparatory to the formation of the backing sheet.

6 Claims, 1 Drawing Figure

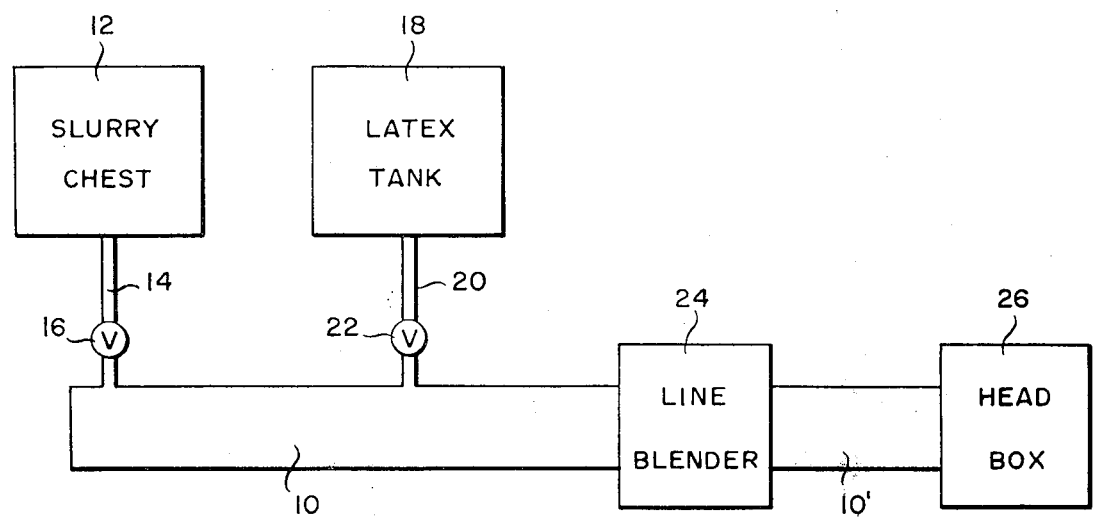

PROCESS FOR MAKING ASBESTOS BACKING SHEETS FOR VINYL FLOOR COVERING

This is a continuation-in-part application of my co-pending application Ser. No. 261,439, filed June 9, 1972 now abandoned, which in turn is a continuation-in-part of application Ser. No. 19,757, filed Mar. 16, 1970 now abandoned.

This invention relates to a process for continuously producing latex binder saturated sheets of asbestos fibers and relates more particularly to such a process which is a substantial improvement over prior art processes for producing synthetic rubber reinforced asbestos sheets.

BACKGROUND AND OBJECTS

Asbestos felt backing sheets, and particularly such sheets as are used in manufacturing floor covering of polyvinyl chloride, etc., have heretofore been manufactured by a batchtype precipitation process wherein a slurry of asbestos fibers is maintained in a vat to which is added a synthetic rubber latex. The synthetic rubber is added as a binder and reinforcement for the asbestos fibers. However, in prior art processes, without suitable chemical or physico-chemical controls, the latex addition normally results in the immediate coagulation of the rubber in the latex with resultant clotting of the fibers into lumps, and the slurry thus becomes unsuitable for the manufacture of sheet materials in a conventional paper making process. Finished sheet materials which are made from such a clotted slurry are generally characterized by a poor distribution of the latex binder and low tensile strength.

The clotting or clumping is believed to be caused by the presence of cations, and particularly magnesium ions in the fiber slurry, which ions are released from the asbestos. These ionic species deleteriously effect the stability of the latex emulsions when the emulsions are added to the asbestos slurry.

Many prior art techniques have been proposed for overcoming the clotting problem, however, these prior art techniques have usually resulted in a substantially increased cost of the end product. For example, chelating agents which sequester the metal ionic species and prevent their interference with the latex emulsion have often been used. Alum is a common agent used for this purpose. Other salts such as sodium chloride, ammonium chloride, etc., have also been added to the slurry to control the deposition of the rubber onto the asbestos fibers.

Other prior art techniques have attempted to overcome these problems by modifying the latex emulsion which is added to the asbestos slurry. Such a process is typified in U.S. Pat. No. 3,193,446 which teaches the use of a synthetic rubber latex containing a minor portion of a high polymer latex containing carboxyl or functionally equivalent groups and a major portion of a standard synthetic latex.

Still another technique used for overcoming the disadvantages of clotting in the latex deposition has been to control the fibers which are utilized. Thus, U.S. Pat. No. 2,940,893 discloses a process which uses a mixture of chrysotile asbestos fibers which carry a positive charge and crocidolite fibers which carry a negative charge when suspended in neutral water. The result is a neutralization of the charges which would otherwise inhibit the deposition of the synthetic rubber onto the fibers.

The present invention deals with the process for mixing the latex emulsion with the fiber slurry, and through suitable control of the mixing variables, the synthetic rubber is evenly deposited onto the fibers. The process does not require the use of any of the prior art additives to the fiber slurry, the latex emulsion, or any other such chemical or physico-chemical controls. Rather, the latex is precipitated onto the chrysotile fibers by virtue of the shear forces imparted to the mixture by the impeller used in the blender. The impeller throws out the solid particles of the rubber which are thusly deposited on the asbestos fibers.

Any of the synthetic rubbers which are conventionally used with asbestos fibers may be used in the process of this invention. Such synthetic rubbers include the styrene butadiene (SBR) latexes, the neoprene latexes, acrylic latexes, etc. Preferably chrysotile asbestos fiber is used.

Another advantage of the present process is that it is carried out continuously as opposed to the more typical batchtype process. This latter type of deposition process is inherently slow in comparison to a continuous process, and again, for commercial purposes, the continuous process is an important consideration.

Therefore, it is a principal object of this invention to provide a process which is continuous in operation for producing felt backing sheets comprising asbestos fibers and a synthetic rubber binder without the use of conventional precipitation aids.

Another object of this invention is to provide a process for producing asbestos fiber sheets having uniformly high quality.

A further object of this invention is to provide a process for the production of sheets of asbestos fiber and a synthetic rubber binder which are capable of being produced in large quantities.

Still another object of this invention is to provide a continuous process for manufacturing asbestos sheet material which effects a uniform mixing and addition of synthetic rubber latex and asbestos.

Still a further object of this invention is to provide a process for producing asbestos sheet material which permits a higher rate of latex addition and a higher amount of latex addition than has been previously possible.

Still a further object of this invention is to provide a process which permits rapid grade changes of formulation as may be desired, and improved or better freeness of the slurry without costly adjustment of the equipment employed during the operation.

Still another object of this invention is to provide a process for depositing a latex binder onto asbestos fiber in a slurry which does not require the addition of a chemical coagulating agent, precipitating agent, modified latex emulsion, surfactant, etc.

Yet another object of this invention is to provide a continuous precipitation process wherein more uniform mixing of the fibers and the binder may be attained.

Yet a further object of this invention is to provide a process which requires a lower capital expenditure for equipment for manufacturing asbestos felt backing sheets than is required by the batch method.

Yet another object of this invention is to provide a process for depositing a latex binder onto asbestos fibers wherein the ionic species which are inherently present in the process water do not interfer with the synthetic rubber latex deposition.

Still another object of this invention is to provide a process wherein the freeness of the precipitated slurry onto the forming wire is improved over the standard batch method.

Still a further object of this invention is to provide a process which permits higher levels of latex precipitation onto asbestos fibers without the use of precipitation aids.

Yet another object of this invention is to provide a process for continuously depositing a latex binder onto asbestos fibers in such a manner as to permit uniform deposition of the synthetic rubber particles onto the fibers.

These and other objects and advantages of this invention will become apparent when considered in light of the following description and claims when taken together with the appended drawing which is a diagrammatic showing of the process of the present invention.

DESCRIPTION OF THE INVENTION

In the drawing, there is illustrated a feed pipe 10 of suitable construction, and above one end of which is a slurry chest or feed box 12. A pipe 14 extends from the bottom of the slurry chest 12 to the feed pipe 10 to permit the asbestos slurry in the chest 12 to gravitate into the feed pipe 10. A valve 16 or suitable pump means (not shown) is provided for controlling the rate of feed of the slurry into the feed pipe 10.

Downstream from the asbestos slurry chest 12 is a latex binder tank 18 having a pipe 20 extending therefrom to the feed pipe 10. A valve or suitable pump means (not shown) controls the rate of flow of the latex binder into the feed pipe. Downstream of the latex binder tank 18 is an in-line blender 24 which is adapted to intimately mix the latex binder and asbestos slurry flowing through the pipe 10 so as to effect continuous precipitation of the latex onto the asbestos fibers. The asbestos fibers having the synthetic rubber deposited thereon then flow through a supplemental feed line 10' to a header box 26 from which the slurry may flow to a conventional sheet forming apparatus such as a Fourdrinier machine, a cylinder machine, or the like.

In accordance with the process of the present invention, the asbestos fibers are slurried at about 3–6 percent consistency in water. Chrysotile asbestos fibers which have a cationic charge in neutral water are used, and a suitable such fiber is sold by the Johns Manville Company and identified as paperbestos. A more preferable consistency of slurry is about 4–5 percent.

As indicated previously, the synthetic rubber latex binder may be any of the conventionally used rubber latexes, however, the styrene-butadiene latexes are preferred. A typical example of the binder composition is as follows:

EXAMPLE I

| % Composition | Material (solids) | Dry Wgt. | Wet Wgt. | Gallons |
|---|---|---|---|---|
| | Water | | 1720 lb | 203 |
| 15.0% | Styrene-Butadiene Latex[1] (46.5%) | 168 lb | 362 | 43 |
| 70.0% | Styrene-Butadiene Latex[2] | 784 | 1540 | 181 |

EXAMPLE I-Continued

| % Composition | Material (solids) | Dry Wgt. | Wet Wgt. | Gallons |
|---|---|---|---|---|
| 15.0% | (51%) Microcrystalline Wax[3] | 168 | 374 | 44 |
| 0.1% | (45%) Defoamer[4] | 4 | 4 | 0.5 |
| | Total | 1124 lb | 4000 lb | 471.5 gal |

[1]Dow Chemical Co., "SD-395" SBR Latex
[2]GAF, "SP-100-66A" SBR Latex
[3]Wax Paracol 505G, Hercules Chemical Corp.
[4]Houghton Chemical Corp. 6080C It has been found that the asbestos slurry may be added to the feed pipe 10 in varying amounts by adjustment of the valve 16. The relative rates of addition of the asbestos slurry and the latex emulsion should be maintained in a ratio of between 20 and 30 to 1, with a ratio between 27 or 28 to 1 having been found to produce optimum results and a high quality sheet material. Thus, with a 4 percent slurry of chrysotile asbestos fibers in water, using a latex such as that of Example I the ratio of asbestos slurry to latex binder should be in accordance with the following table:

| 4% Asbestos Slurry G.P.M. | Latex (28% solids) G.P.M. |
|---|---|
| 170 | 6.16 |
| 180 | 6.56 |
| 190 | 6.90 |
| 200 | 7.30 |
| 210 | 7.63 |
| 220 | 7.94 |
| 230 | 8.35 |
| 240 | 8.80 |
| 250 | 9.10 |

The asbestos slurry and latex binder are carried to an in-line blender 24 which is a commercially available unit. A suitable mixer has been found to be one identified as Model 6 LBC-300 manufactured by the Mixing Equipment Co., Inc., which is a variable speed blender capable of handling up to 300 gallons per minute. The blender 24 has a maximum speed capability of 1200 revolutions per minute, and in production use is preferably operated at that rate. For a smaller scale operation, the speed of the blender may be reduced in accordance with the volume of slurry mixture introduced thereto. However, the ratio of the volume in gallons of the slurry mixture to the speed of the blender in revolutions per minute should be between 1:3 and 1:4. By maintaining this ratio, the precipitation of the latex onto the asbestos fibers is carried out by virtue of the shear forces of the impeller of the mixer throwing out the solid particles which are deposited onto the asbestos fibers.

The slurry leaving the mixture contains asbestos fibers which have the synthetic rubber deposited thereon, and the slurry is then conveyed to a tank or head box 26 from which the mixture is fed to a sheet forming machine.

It has been found that optimum results are obtained in the process if the asbestos slurry is maintained at a slightly elevated temperature of 80°–120°F, and the latex binder is at room temperature when the two components are fed into the feed line 10.

To test the results of this invention, samples were prepared using the latex formulation previously set out in Example I, with a 4 percent Paperbestos slurry. The samples 1–2 were obtained by the conventional batch precipitation process, while samples 3–25 were prepared in accordance with the process of this invention and were tested for freeness by a Williams Freeness Tester. The results for these samples are tabulated below:

It is readily seen from the table that the freeness or drainage rate of Samples 3–25 is greatly improved over control Samples 1 and 2. In each case, complete deposition of the latex onto the abestos fibers was achieved.

The latex solution which is added to the fibrous slurry preferably contains 20–30 percent solids. Since suppliers usually provide the latices at about 45–55 percent solids, the provided latex is usually diluted to within the stated range of solids. The exact percentage of solids utilized is dependent upon the type of latex added and the use for which the product is intended.

The conventional batch process requires considerable time to complete the precipitation cycle. This time varies with the size of the equipment. This cycle consists of charging the batch unit with asbestos fiber slurry, addition of adequate latex to the asbestos slurry, agitated until the latex is completely precipitated, and then discharging of the latex-treated asbestos into a chest. The precipitation portion of this cycle is not as uniform as in the case of the continuous system because the earliest addition of latex is overworked and the final latex addition may not be completely precipitated. Continuous agitation in the holding chest is needed to level out the non-uniform latex-treated asbestos fibers before conveying to the head box. The excess agitation required by this method produces a slower draining stock as previously shown.

In the present invention, the residence time is greatly reduced with improved freeness values. This provides increased output capability of a plant using the process of this invention.

The process of the present invention is completely automatic and requires substantially no controls once the valves 16 and 22 have been regulated to produce the required flow rate. Additionally, the formulation of the fibrous slurry and the latex binder may be readily adjusted as desired for different purposes. Also, a uniform mixing of the asbestos slurry and latex binder are effected, thereby producing uniform end products. The equipment employed to carry out this process is of such a nature that the capital expenditure necessary to manufacture the sheet material in accordance with this process is considerably less than conventional processes.

The process of this invention is particularly well suited when it is necessary to add a higher percentage of latex to the slurry, for example on the order of 10–35 percent latex to asbestos fibers on a solid basis. To get a high quantity of latex deposited on the fibers in a batch-type process, the residence time of binder fiber slurry mixture in the precipitator must be greatly lengthened.

In addition to permitting a higher latex addition rate and thus a greater product output, this process may also permit a greater variety of latices to be added. For example, acrylic latices are well suited for use in this process. Suitable latices include acrylonitrile-butadiene-styrene, acrylonitriles, polyvinyl chloride, polyvinylidene chloride, and neoprene.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A process for continuously producing a sheet of chrysotile asbestos fibers having a latex binder, the process being carried out without chemical additives or precipitating agents for controlling the latex deposition, the process comprising:
   a. admitting an aqueous slurry of about 3–6 percent consistency of chrysotile asbestos fibers in water to a process line,
   b. admitting at least about 10 percent on a dry weight basis of a synthetic rubber latex binder of about 20–30 percent solids content and free of precipitation controlling agents to said process line so that the ratio of the rates of addition of the asbestos fiber slurry to the latex binder is substantially within the range of about 20:1 to 30:1,
   c. introducing the aqueous asbestos fibersynthetic rubber latex mixture into a blender so that the ratio of the volume in gallons of the mixture to the speed of the blender in revolutions per minute is between 1:3 and 1:4 so that the shear forces of the impeller of the blender throw out the latex particles and thereby deposit the latex on the fiber in a controlled manner without chemical deposition controlling agents,
   d. thereafter feeding the fibrous slurrybinder mixture to a sheet forming apparatus, and
   e. forming a sheet from said slurry mixture.

2. A process as in claim 1 and wherein:
said asbestos fiber slurry is about 4–5 percent asbestos fibers in water by weight.

3. A process as in claim 1 and wherein:
the ratio of the feed rate of the asbestos fiber slurry to the feed rate of the latex binder is about 27:1 to 28:1.

4. A process as in claim 1 and including:
maintaining said asbestos fiber slurry at a temperature of about 80°–120°F prior to the introduction of the latex binder.

5. A process as in claim 1 and including:
depositing about 10 to about 35 percent of latex binder on the asbestos fibers on a dry weight basis.

6. A process as in claim 1 and wherein:
said latex binder is a styrene-butadiene latex.

* * * * *